United States Patent [19]

de Greef

[11] Patent Number: 4,856,144

[45] Date of Patent: Aug. 15, 1989

[54] METHOD AND AN APPARATUS FOR TRANSPORTING SLAUGHTER ANIMALS DURING SLAUGHTERING, PACKAGING OR OTHERWISE PROCESSING SAID ANIMALS, IN PARTICULAR POULTRY

[75] Inventor: Willem M. de Greef, Lunteren, Netherlands

[73] Assignee: Terpa Poultry B.V., Amstelveen, Netherlands

[21] Appl. No.: 121,313

[22] Filed: Nov. 16, 1987

[30] Foreign Application Priority Data

Nov. 17, 1986 [NL] Netherlands ................. 8602913

[51] Int. Cl.$^4$ ................................................. A22B 5/00
[52] U.S. Cl. .................................... 17/24; 17/11; 198/465.4
[58] Field of Search .................... 17/11, 24; 198/465.4

[56] References Cited

U.S. PATENT DOCUMENTS

| 996,799 | 7/1911 | Schmidt | 17/24 |
| 3,077,997 | 2/1963 | Toennies | 17/24 X |
| 4,316,535 | 2/1982 | Brems et al. | 198/465.4 |

Primary Examiner—Willis Little
Attorney, Agent, or Firm—Sprung Horn Kramer & Woods

[57] ABSTRACT

A method of transporting slaughter animals, in particular poultry, during slaughtering, from a conveyor having suspension hooks to a packaging device, a dissecting device or a similar device. The slaughter animals are transferred from the suspension hooks to a buffer conveyor wherein the slaughter animals are buffered in oriented array. From the buffer conveyor, they are transferred in oriented array to a gripper device of the packaging device or the like.

20 Claims, 5 Drawing Sheets

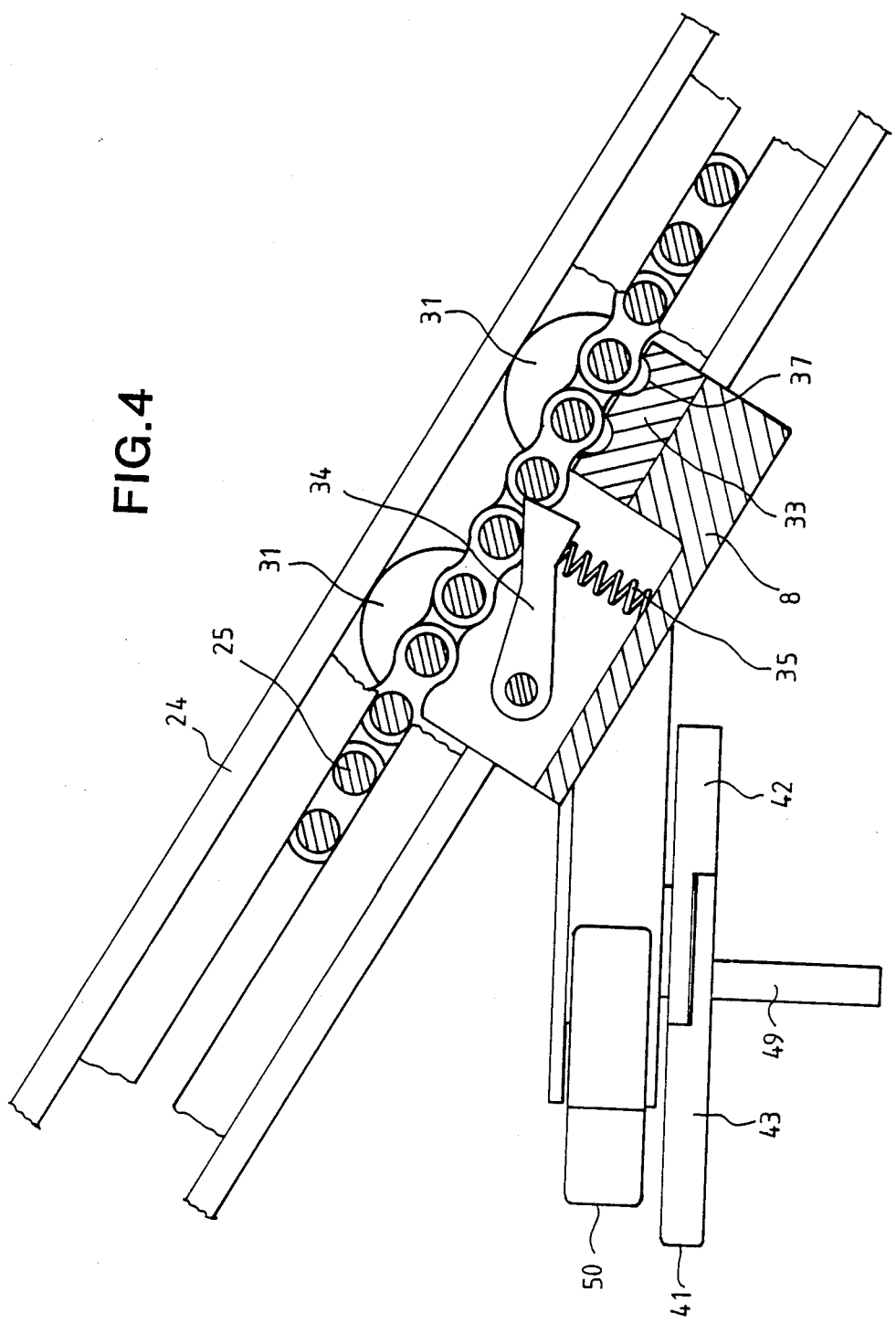

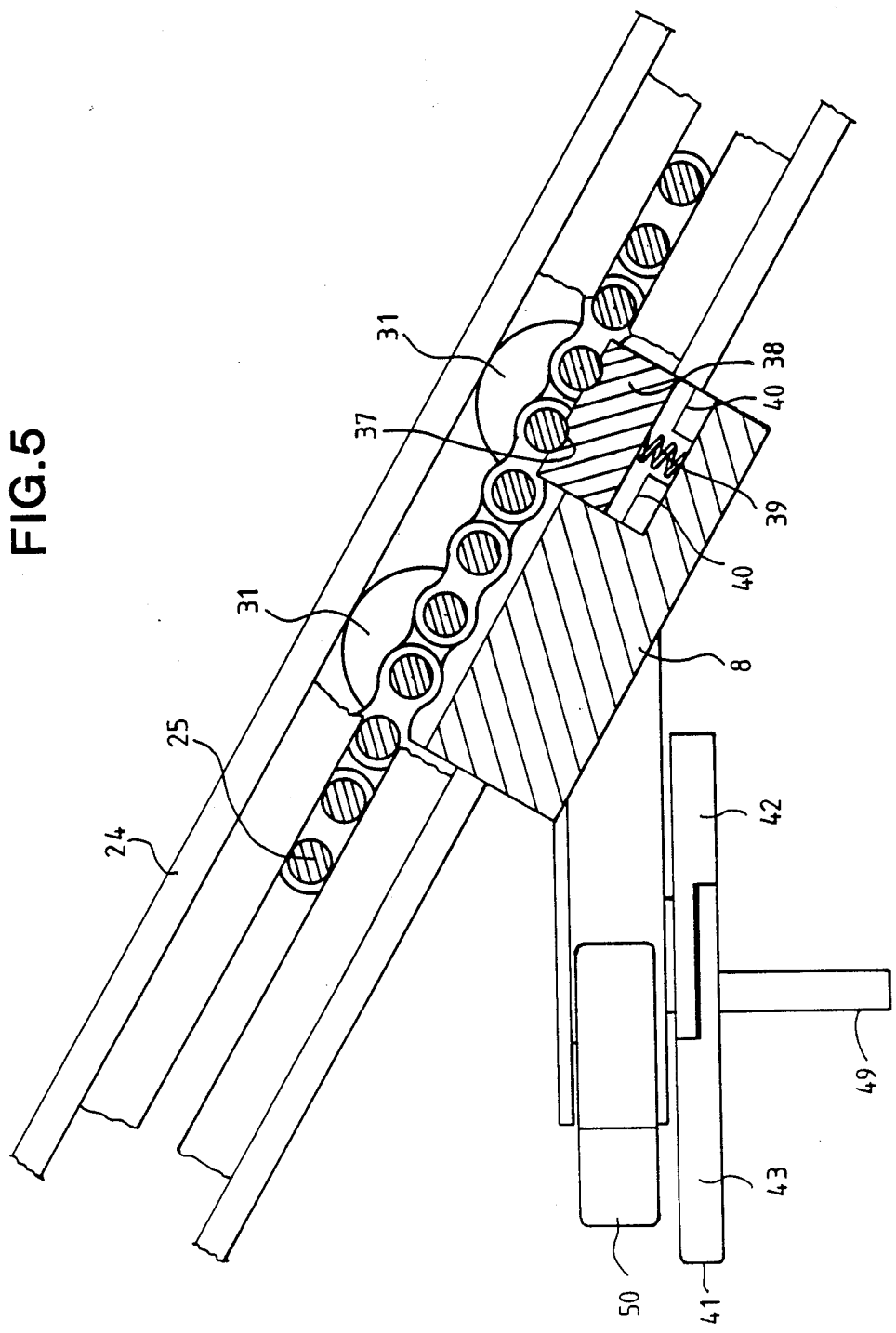

METHOD AND AN APPARATUS FOR TRANSPORTING SLAUGHTER ANIMALS DURING SLAUGHTERING, PACKAGING OR OTHERWISE PROCESSING SAID ANIMALS, IN PARTICULAR POULTRY

This invention relates to a method of transporting slaughter animals, in particular poultry, during slaughtering, from a conveyor with suspension hooks to a packaging device, a dissecting device or a similar device.

During industrial slaughtering of e.g. poultry, the poultry is hanging by the legs from suspension hooks of a substantially horizontal conveyor track.

During transport, the poultry is subjected to the required butchering operations, such as the removal of the head, feathers and entrails. The poultry is subsequently weighed and, depending on the weight, thrown out of the hooks of the conveyor to fall into a subjacent storage bin or buffer bin associated with such weight. The poultry is then removed manually from the buffer and positioned for further processing e.g. packaging or dissection, on a device arranged downstream thereof.

Such a method has various drawbacks. The first is that during the further processing of the poultry, each bird has to be removed manually from the storage bin or buffer and has to be re-positioned for subsequent processing: this is labour-intensive and hence expensive.

A second drawback is that the poultry may be bruised when falling from the hooks into the storage bins.

In addition to the fact that the poultry may be bruised when falling into the buffer bin, this method has the additional drawback that when the supply of poultry to the buffer bin exceeds the removal therefrom, the lowermost birds are unduly compressed for a prolonged period, thereby undergoing an appreciable loss in weight.

It is an object of the present invention to remove these drawbacks.

To that effect, the method of the present invention is characterized in that the slaughter animals are transferred from the suspension hooks to a buffer conveyor wherein the animals are buffered in oriented array and are transferred from the buffer conveyor in oriented array to a gripping device of the packaging station or the like. The buffer conveyor may be provided with a plurality of suspension carriages having suspension hooks.

In this method, use can be made of a buffer conveyor having a rail guide along which the suspension carriages are movable through drive means, with a part of said rail guide being designed in such a manner that the carriages are out of engagement with said drive means.

Preferably, the buffer conveyor is designed so that the buffer track slopes downwardly so that the carriages with the slaughter animals hanging therefrom move to the lowest point through gravity, where they can be transferred from the suspension carriages to gripper arms of the device following the buffer conveyor.

The present invention further relates to a buffer conveyor for slaughter animals comprising a rail guide along which suspension carriages for said animals can be displaced through drive means, said conveyor being characterized in that the suspension carriages are out of engagement with said drive means along one or more conveyor track portions. Along the buffer track, for example, the drive means may be arranged on the rail guide so as to be spaced apart from engagement means of the suspension carriages.

In a further elaboration of the present invention, the suspension carriages moving along the track of the buffer conveyor may be provided with braking means to prevent the carriages with the animals hanging therefrom from colliding with each other at high speed. Said braking means may comprise a spring-loaded pawl co-acting with the drive means and mounted on the suspension carriage for swivelling movement in such a manner that when the suspension carriage is buffered the pawl can be swivelled out of engagement with the drive means against spring action.

Another solution consists in that the engagement means are mounted on the suspension carriage for swivelling movement and are spring-loaded and in engagement with said drive means, said engagement means being arranged so that when the suspension carriages are buffered the engagement means are moved out of engagement with said drive means against the action of the spring means.

Preferably, the buffer conveyor is a closed, triangular conveyor. The conveyor may be provided with a blocking element that can be moved into its track. Said blocking element may be coupled to a detection switch placed alongside the conveyor for detecting a suspension carriage, which carriage may itself be provided with an actuation element for actuating said switch.

Said actuation element may be arranged in such a manner that it is in a position suitable for actuation of the detection means only if a slaughter animal is present in the suspension carriage. For instance, the actuation element may be a swivelling butterfly which is swivelled into a position suitable for actuation of the detection means by placing a slaughter animal in the suspension carriage.

Some embodiments of an apparatus for transferring and buffering poultry from a slaughtering line and/or weighing line to a downstream device for further processing will now be described, by way of example, with reference to the accompanying drawings, in which:

FIG. 4 is a longitudinal section of the suspension carriage shown in FIG. 2; and FIG. 5 is a longitudinal section of another embodiment of the suspension carriage.

Figure 1:
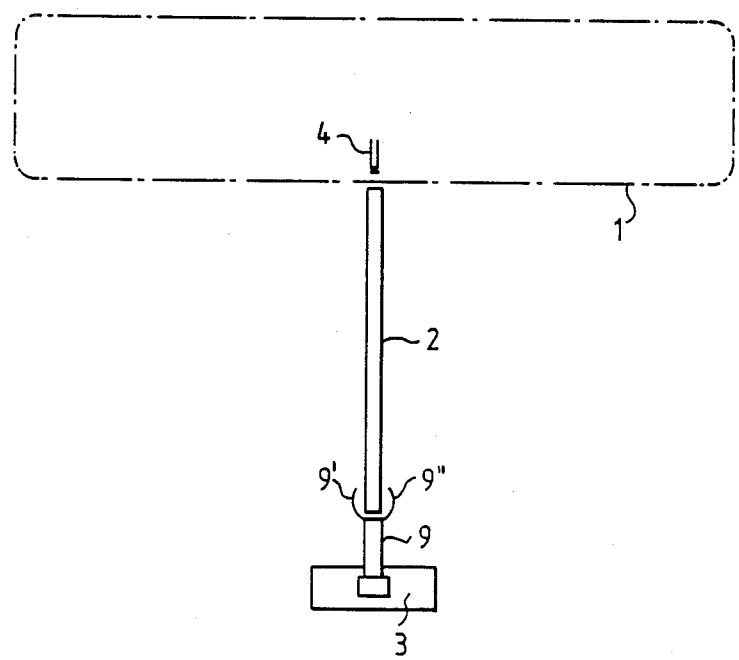
FIG. 1 is a diagrammatic top view of a slaughtering line and/or weighing line, a buffer conveyor according to the present invention and a downstream packaging device.

As shown in FIG. 1, a plurality (only one being shown in the drawings) of buffer conveyors 2 are arranged along a substantially horizontal transport track 1. Poultry 7, hanging from suspension hooks 6, is passed along the track 1 and is subjected to several butchering operations, such as the removal of head and feathers, the removal of entrails, etc. After subjecting the poultry to these operations, the poultry is weighed and, depending on its weight, is transferred from transport track 1 onto a buffer conveyor 2 for that weight category. From buffer conveyor 2, the poultry is thereby pushed from the suspension hook into a suspension carriage of the buffer conveyor 2 (FIG. 2) by means of a cylinder, in the present case pneumatic cylinder 4, having a push rod, after activation of the pneumatic cylinder. At the desired place the poultry 7 is again removed from the buffer conveyor 2 by means of a gripping device 5, comprising two gripper elements 9' and 9" of a gripper arm 9, between which the poultry can be clamped. Gripper arm 9 can be swivelled around a shaft 10 of buffer conveyor 2, whereby the poultry 7 is positioned in a packaging device 3, shown diagrammatically, for it to be subsequently packaged. However, it is also possible for the poultry to be positioned by the gripper elements 9' and 9" in another device, e.g. for dissecting the poultry.

Figure 2:
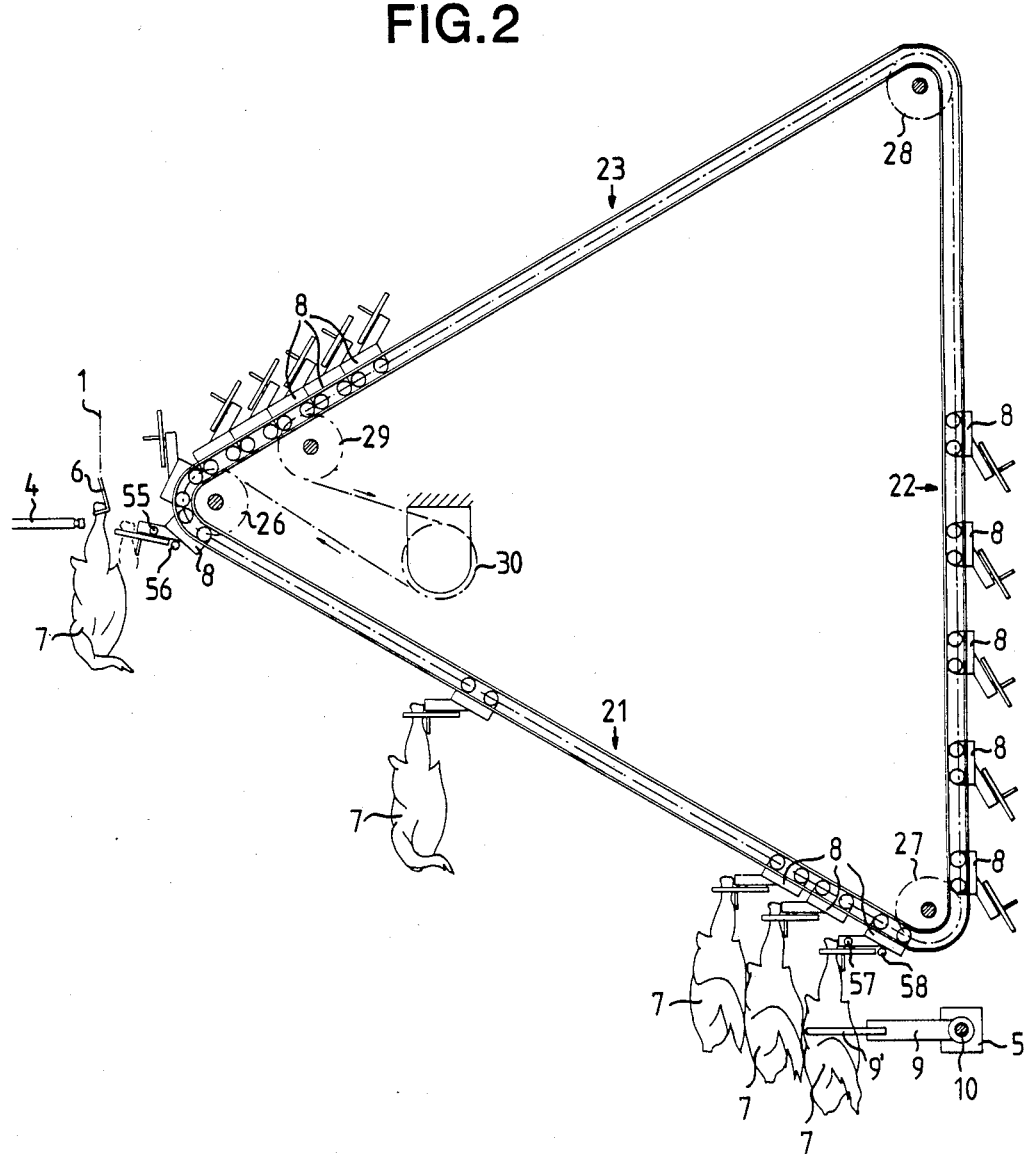
FIG. 2 is a diagrammatic side view of the buffer track used in the apparatus shown in FIG. 1.
Figure 3:
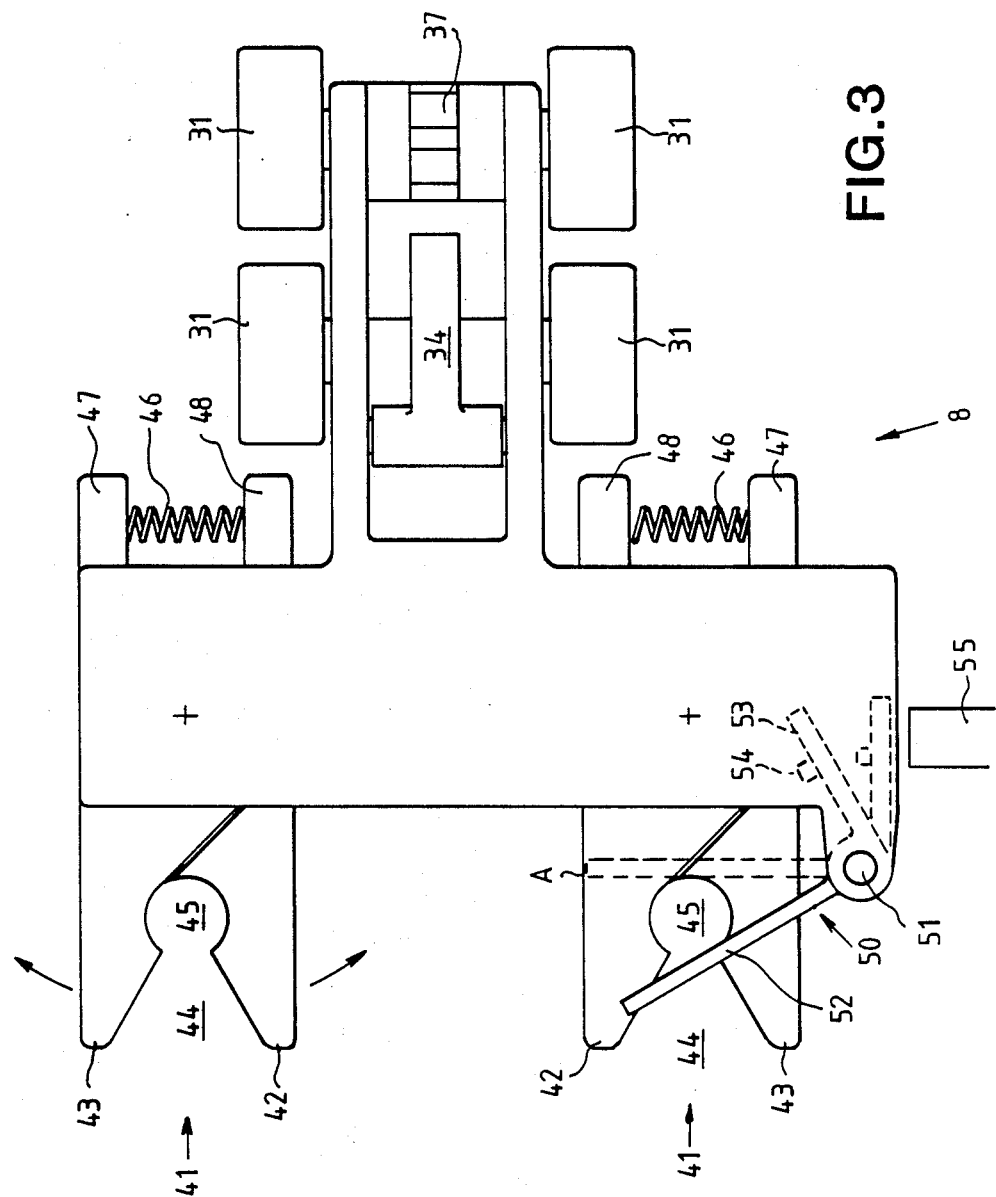
FIG. 3 is a top view of a suspension carriage used in conjunction with the buffer conveyor shown in FIGS. 1 and 2.

The buffer conveyor 2 shown in FIG. 2 is preferably triangular, but may have any other configuration without any objection. The triangular conveyor 2 comprises three tracks 21, 22 and 23. On track 21, the buffer conveyor can buffer a plurality of suspension carriages 8 with poultry 7 when the speed of removal of poultry from the suspension carriages lags behind the feeding speed thereof. Empty carriages 8 are returned along tracks 22 and 23. Along track 23 the buffer conveyor can then buffer empty suspension carriages 8, which are waiting for the transfer of poultry from the hooks 6 of conveyor track 1. Also, a certain buffer of empty suspension carriages is maintained on track 23 to ensure that a suspension carriage 8 is always available upon arrival of poultry to prevent conveyor track 1 from having to stop to wait for the arrival of a suspension carriage 8.

The buffer conveyor 2 comprises a rail guide 24 installed along the tracks 21, 22 and 23, as well as a drive chain 25 incorporated in rail guide 24. Drive chain 25 is passed over gears 26, 27 and 28 in the corners between tracks 21, 22, 23 of the triangular buffer conveyor 2. The drive chain is further passed by means of gear 29 out of rail guide 24 over a drive wheel 30 and is returned via gear 26 into rail guide 26. Drive wheel 30 is drivable by means of a motor, not shown.

The suspension carriage 8 comprises wheels 31 running in rail guide 24 (FIGS. 4, 5). The embodiment of carriage 8 shown in FIG. 4 further includes an engagement block 33 and a spring-loaded pawl 34. The chain 25 is mounted in rail guide 24 in such a manner that, on tracks 21 and 23, the chain remains out of engagement with block 33. On descending tracks 21 and 23, carriage 8 can in principle travel downwards along the rail guide through gravity. To prevent carriage 8 from travelling at too high a speed, pawl 34 is pressed against chain 25 by spring 35, so that, at any rate, carriage 8 cannot be advanced more quickly than chain 25. If buffering of carriages occurs on tracks 21 and 23, chain 25 will push away pawl 34, against the action of spring 35, so that chain 25 can move along the buffered carriages 8 without taking the carriages along. Chain 25 on the ascending track 22 is positioned in rail guide 24 in such a manner that chain 25 and engagement block 33, containing recesses 37 for chain 25, do engage with one another so that carriage 8 is carried along by chain 25.

In the embodiment of suspension carrier 8 shown in FIG. 5, the function of the engagement block and the pawl is combined in an engagement block 38 which is loaded by a spring 39. It is true that on the descending tracks 21 and 23 engagement block 38 is in engagement with chain 25, but when buffering takes place, it can be brought out of engagement with chain 25 against the action of spring 39. On track 22, chain 25 runs so closely along block 38 that a maximum depression of the block 38 defined by defining elements 40, against the action of spring 39, is not sufficient to keep chain 25 and block 38 out of engagement. Suspension carriage 8 is further provided with two gripping members 41, each having two clamping portions 42, 43, defining a tapering space 44 passing into a circular space 45 likewise defined by clamping portions 42, 43, wherein the legs of the poultry can be hung. Clamping portions 42, 43 are urged towards one another by a spring 46 mounted between the ends or lugs 47, 48 of clamping portions 42, 43 away from the tapering space 44. When the poultry is transferred from track 1 onto the buffer conveyor 2, the poultry is pushed from the hooks 6 of track 1 and pressed with the legs into the tapering space 44 of the gripper members 41, so that the clamping portions 42, 43, will move apart against the action of springs 46 and the legs are received in the circular space 45, after which the clamping portions 42, 43 are again moved towards one another by the springs 46, thereby clamping the legs of the poultry. When the poultry 7 is removed from the buffer conveyor 2, the poultry 7 is held by the gripper elements 9', 9" of the gripper device 9. Due to the continuous movement of the carriage 8 and the abutment of the poultry against the gripper elements 9', 9" of gripper arms 9 of gripper device 5, the legs of the poultry are pulled out of the gripper members 41 by urging the clamping portions 42, 43 apart, against the action of springs 46, and are subsequently positioned by gripper device 5, in the present case in packaging device 3.

On the underside of the suspension carriage 8, there is provided a stabilizing rod 49 (FIGS. 4, 5) which, when the carriage 8 follows the descending track 21, is directed substantially vertically downwards. Longitudinally of the carriage 8, rod 49 slightly offset relatively to the centreline between the two gripper members 41 in such a manner that on track 21, the poultry 7 abuts against the stabilizing rod 49 and cannot oscillate excessively.

Mounted on suspension carriage 8, adjacent one of the gripper members 41, is further a butterfly 50, which is mounted on carriage 8 for swivelling movement around shaft 51. Butterfly 50 comprises substantially two co-planar but perpendicular, interconnected arms 52, 53. During a swivelling movement, arm 52 moves above the tapering space 44 and the circular space 45 of the adjacent gripper member 41. Butterfly 50 is loaded by a coil spring, not shown, in such a manner that butterfly 50 is pressed together with arm 52 in the direction of the enlargement of the tapering space. The swivelling movement of butterfly 50 is limited by a projection 54. The swivelling movement of butterfly 50 in the opposite direction, against the action of the coil spring, is limited in such a manner that in that swivelled position arm 53 extends parallel try is received with one leg in the gripper member 41, arm 52 of butterfly 50 is above the adjacent gripper member 41. By placing poultry with the legs in clamping members 41, butterfly 50 is swivelled about shaft 51, against the action of the coil spring, and arm 53 comes to lie sideways along one side of the carriage 8. Due to the approximation of arm 53, an approximation switch 55 situated near the transport track 1 along buffer conveyor 2 is actuated. Switch 55 thereby effects the removal of a blocking pin 56 (FIG. 2) provided in the path of the carriages 8 adjacent the transfer position for poultry of track 1 on buffer conveyor 2. After carriage 8 with the poultry contained therein has passed, the blocking pin 56 moves again into the path of the carriages 8. The combination of butterfly 50 with approximation switch 55 and blocking pin 56 ensures that only carriages containing poultry are passed along the track 21.

At the transfer point of poultry of the buffer conveyor 2 on the packaging device 3, the same butterfly 50 can be employed in combination with a second approximation switch 57 provided near said transfer point along the buffer conveyor 2. Approximation switch 57 can detect whether a suspension carriage 8 is retained ahead of the transfer point by a second blocking pin 58. If also the packaging device 3 is again free for the next packaging cycle, a signal transmitted therefor, in combination with a signal from the approximation switch 57, can effect that the second blocking pin 58 is removed and the gripper device 5 is actuated so that the gripper device pulls the poultry 7 out of the advancing carriage 8 and positions the same into the packaging device 3.

The buffer conveyor according to the present invention enables continuous transport and completely mechanical transfer of poultry, and moreover offers a buffering possibility for empty suspension carriages, as well as suspension carriages with poultry hanging therein, so that irregularities in the supply and discharge of poultry and differences in speed between supply and discharge can be taken up without any problem. The mechanical processing of the poultry ensures an optimum handling of the poultry and provides for a high quality of the final product.

It is observed that after reading the above, various modifications of the buffer conveyor described will readily occur to those skilled in the art. For instance, the suspension carriage may be mounted in the guide rail for swivelling movement by means of e.g. wheels of different diameter and be provided at the top with recesses for engagement with the drive chain in such a manner that the carriage remains out of engagement with the chain through the weight of the poultry or the weight of the carriage along a descending track, but along an ascending track is precisely in engagement with the chain and is carried along. The chain may furthermore be in engagement with the carriages along the entire track of the buffer conveyor and be brought out of engagement only along a part of the track along which buffering is to take place.

Besides, different drive means can be used for the chain without any objections, e.g. a toothed belt. Such modifications are deemed not to depart from the scope of the present invention.

Finally, it will be clear that within the scope of the present invention, corresponding conveyors may be used for other slaughter animals, such as hares, rabbits and the like.

What I claim is:

1. A conveyor for slaughter animals comprising a rail guide, suspension carriages for the slaughter animals movable along the rail guide, drive means for displacing the carriages along the rail guide and wherein the carriages are out of engagement with the drive means along at least one rail guide portion where the conveyor serves as a buffer conveyor and wherein the buffer conveyor is a closed, triangular conveyor.

2. A buffer conveyor as claimed in claim 1, wherein the buffer conveyor has a blocking element movable into the rail guide of the conveyor.

3. A buffer conveyor as claimed in claim 2, wherein the blocking element is coupled to a detection switch for detecting a suspension carriage, said switch being placed along the conveyor.

4. A buffer conveyor as claimed in claim 3, wherein the suspension carriage is provided with an actuation element for the detection switch.

5. A buffer conveyor as claimed in claim 4, wherein the actuation element comprises a swivelling butterfly which, by placing a slaughter animal in the suspension carriage, is swivelled into a position suitable for actuation of the detection member.

6. A system for transporting slaughter animals comprising:
transporting means having a track and a plurality of suspension hooks for hanging slaughter animals in a vertical state while moving along the track; buffer conveyor, each having a rail guide, suspension carriages for holding animals in a vertical state movable along the rail guide for orienting the carriages, in an array and means for driving the carriages along only a section of the rail guide; means for transferring the slaughter animals from the suspension hooks to suspension carriages of the buffer conveyors; and gripping means for removing the slaughter animals form the suspension carriages.

7. A system as claimed in claim 6, wherein the carriages are out of engagement with the drive means along at least one track portion of the buffer conveyor.

8. A system as claimed in claim 7, wherein the suspension carriages have rail guide engagement means and wherein the drive means are mounted on the rail guide spaced apart from the engagement means of the suspension carriages.

9. A system as claimed in claim 8, wherein the suspension carriages comprise brake means.

10. A system as claimed in claim 9, wherein the brake means comprises a spring-loaded pawl coacting with the drive means and mounted on the suspension carriage for swivelling movement out of engagement with the drive means against a spring action.

11. A system as claimed in claim 9, wherein the engagement means are spring-loaded and are mounted on the suspension carriage for swivelling movement into and out of engagement with the drive means against spring action.

12. A system as claimed in claim 6, wherein each buffer conveyor is a closed, triangular conveyor.

13. A system as claimed in claim 4, wherein each buffer conveyor has a blocking element movable into the railguide.

14. A system as claimed in claim 13, wherein the blocking element is coupled to a detection switch for detecting a suspension carriage and wherein said switch is disposed along the conveyor.

15. A system as claimed in claim 14, wherein each suspension carriage has an actuation element for the detection switch.

16. A system as claimed in claim 15, wherein the actuation element comprises a swivelling butterfly which is swivellable into a position suitable for actuation of the detection member when an animal is on the suspension carriage.

17. A method of transporting slaughter animals, comprising: hanging slaughter animals from suspension hooks in a vertical state; passing the suspension hooks along a track with the hung animals in a vertical state and subjecting the hanging animals to butchering operations; weighing the butchered animal while hanging;

transferring each weighed animal to one of a plurality of buffers conveyors in dependence on the weight of the animal by directly removing the animal from a suspension hook and orienting the removed animals in a given array in a vertical state; removing the buffered animals from the buffer conveyor by moving the animals along buffer conveyor and gripping same while in the vertical state; and packaging the removed animals.

18. A method as claimed in claim 17, wherein the animals are moved on the buffer conveyor by hanging same from a plurality of carriages having suspension hooks.

19. A method as claimed in claim 18, wherein the animals are moved on the hooks by suspending the carriages on a rail guide and driving same with along a section of the rail guide.

20. A method as claimed in claim 19, wherein the buffer track slopes downwards and wherein the carriages with the slaughter animals hanging therefrom move towards a lowest point through gravity and wherein the gripping is carried downstream of the buffer conveyor.

* * * * *